United States Patent [19]

Laurent et al.

[11] 3,718,671
[45] Feb. 27, 1973

[54] 21-HALOGEN STEROIDS
[75] Inventors: Henry Laurent, 1 Berlin 37; Karl-Heinz Kolb, 1 Berlin 45; Rudolf Wiechert, 1 Berlin 39, all of Germany
[73] Assignee: Schering Aktiengesellschaft, Berlin and Bergkamen, Germany
[22] Filed: March 11, 1970
[21] Appl. No.: 23,117

[30] Foreign Application Priority Data
March 11, 1969 Germany.................P 19 13 042.8
Jan. 29, 1970 Germany.................P 20 04 767.0

[52] U.S. Cl. ..........260/397.3, 260/397.45, 424/243
[51] Int. Cl.............................................C07c 169/34
[58] Field of Search......./Machine Searched Steroids

[56] References Cited

UNITED STATES PATENTS 3,290,338  12/1966  Shapiro et al. ....................260/397.4
3,364,203  1/1968  Beard et al. ........................260/239.5
3,546,215  12/1970  Fried...............................260/239.55

Primary Examiner—Henry A. French
Attorney—Michael S. Striker

[57]  ABSTRACT 21-halogen steroids having the formula

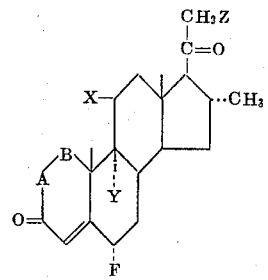

(I)

wherein —A—B— is —CH=CH— or —CCl=CH—, Y and Z are each a halogen atom, and X is a halogen atom having the same or a lesser atomic weight than Y and in the case where —A—B— is a —CCl=CH— group, X can also be hydroxyl.

17 Claims, No Drawings

21-HALOGEN STEROIDS

This invention relates to a novel class of halogen steroids having the formula:

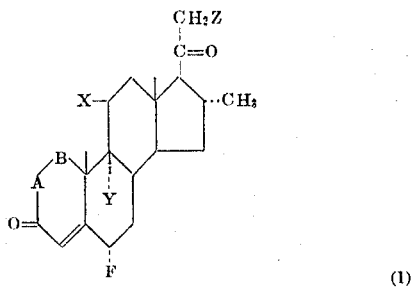

wherein —A—B— is —CH=CH—, or —CCl=CH— Y and Z are each a halogen atom, and X is a halogen atom having the same or a lesser atomic weight than Y and in the case where —A—B— is a —CCl=CH— group, X can also be hydroxyl.

The invention also includes the novel methods of preparing the 21-halogen steroids of the formula. The steroids of the invention can be prepared by the following methods:

a. adding to a $\Delta^{9(11)}$-double bond of a 21-halogen steroid having the formula:

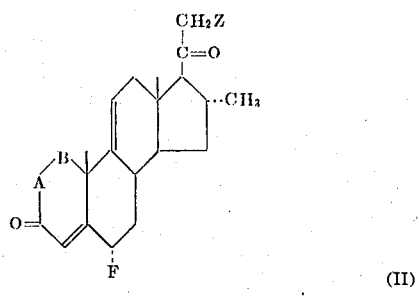

wherein the groups —A—B— and Z have the same meanings as given above, halogen or hypohalogeneous acid and in the case where the final desired products are 9α-fluoro-2-chloro-11β-hydroxysteroids, the 9α-chloro- or bromo-11β-hydroxysteroid of Formula I are converted into the corresponding 9,11β-epoxysteroid and thereafter the epoxy ring is split with hydrogen fluoride, or b. exchanging the 21-hydroxy group of a 21-hydroxysteroid having the formula:

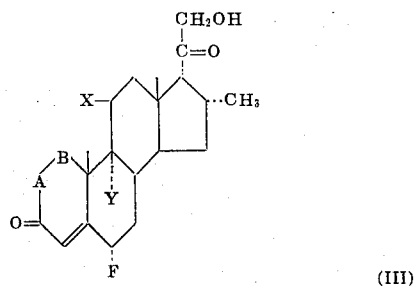

wherein the groups —A—B—, X and Y have the same meanings as given above, for halogen.

For introducing the halogen atom at the $\Delta^{9(11)}$-double bond in accordance with the procedure set out under (a), there exist a number of possibilities. For instance, halogen, such as chlorine or bromine or combinations thereof, as for instance, chloromonofluoride or bromomonochloride, or halogen from polyhalogenides, as for instance, potassium triiodide or iodine benzene dichloride, can be directly attached to the double bond.

Particularly advantageous is the halogen addition where there is added simultaneously a positive and a negative halogen atom to the $\Delta^{9(11)}$-steroid. As reagents which contain positive halogen, there may be mentioned: halogen succinimide, halogen acetamide or the halogens themselves. As negative halogen sources, there are suitable, for instance, hydrohalic acid and alkali metal halogenides, preferably lithium halogenide, i.e., lithium chloride and lithium bromide.

The addition of halogen onto the $\Delta^{9(11)}$-double bond of the steroid is carried out so that the positively charged halogen adds onto the 9-position and the negatively charged halogen is added onto the 11-position of the molecule. The atomic weight of the halogen in the 9-position because of the known different electronegativities of halogens cannot be less than the halogen in the 11-position. The halogen addition to the $\Delta^{9(11)}$-double bond takes place preferably at temperatures of between −75°C to 50°C.

The addition of hypohalous acids to the $\Delta^{9(11)}$-double bond of the compound having Formula II is carried out in accordance with the heretofore known methods. A prefer-red method is the treatment of the $\Delta^{9(11)}$-double bond with reagents which in the presence of water and in acid reaction medium act to decompose hypohalous acids and to free the halogen and especially with halogen cation forming reagents such as N-chloro- or N-bromoacetamide or N-halogenacylimide and most preferably N-bromo- or N-chlorosuccinimide.

In the case where it is desired that the final products be 9α-fluoro compounds, then following the halogenhydrine addition to the 9,11-double bond, using the known procedure, for instance, treatment with basic reagents such as NaOH, KOH, $I_2CO_3$, potassium acetate, pyridine and the like, preferably at elevated reaction temperatures, the 9α-bromo- (or chloro-)11β-hydroxy group can be closed to form a 9,11-oxide ring, which can then be transformed with hydrofluoric acid into the 11β-hydroxy-9α-fluoro group.

The exchange of the 21-hydroxy group for a halogen atom in accordance with the process set out at (b) is also carried out by conventional methods. A particularly preferred method involves the esterification of the 21-hydroxy group with sulfonic acid, preferably with methane sulfonic acid or p-toluene sulfonic acid and then exchanging the sulfonic acid group for halogen. The esterification of the 21-hydroxy group takes place for instance by reacting a compound of Formula III with sulfonic acid chloride in the presence of an organic base, for instance pyridine, or in the presence of aqueous alkali. The exchange of the sulfonic acid group for a halogen atom takes place most advantageously by reacting a 21-sulfonic acid ester with an alkalihalogenide such as lithium chloride or potassium hydrogen fluoride in the presence of a polar solvent, as for instance dimethyl formamide, at a reaction temperature of 50 to 180°C.

A further method for carrying out the exchange of the 21-hydroxy group for a halogen atom is carried out by reacting a compound of Formula III with a conventional halogenation agent, as for instance, thionyl chloride or methane sulfonic acid chloride. This reaction is preferably carried out with an excess of the halogenating agent in the presence of an organic base, for instance pyridine, at a reaction temperature below 80°C.

The new compounds when evaluated by the vasoconstriction test carried out with male subjects exhibited, following local application, a marked inflammation-inhibiting activity, as can be seen from the table which follows, wherein compounds corresponding to Examples 2–7 of the application have been compared with the known 6α-fluoro-11β,21-dihydroxy-16α-methyl-1,4-pregnadiene-3,20-dione (Compound I). These results were most surprising as the compounds of Examples 2–7 contain no free or esterified hydroxyl groups.

The experimental demonstration of clinical superiority of the compounds of the invention in the vasoconstrictor test were conducted as follows: On the backs of male experimental subjects (18–38 years of age), a marked hyperemia was produced by drawing over the backs of the subjects for 20 successive times a 2 cm. wide Tesa film which cut up the stratum corneum of the skin. There was then applied to a designated 4 cm² size field within the stripped area and under equal application of pressure about 50 mg of a water/oil salve base which contained 0.1%, 0.01%, 0.001% respectively of the test substance. The backs of the subjects were then photographed at designated time intervals with Kodak colorfilm. For evaluating the hyperemia and the vasoconstriction, the color of a particular skin field in the Kodak colorfilm was converted into its corresponding brightness value. The sections projected from the colorfilm through a diaphragm onto an interference filter can be differentiated through their brightness. As brightness indicator, there was used a secondary electronic multiplier and for the estimation of the color values, the anode current of the secondary multiplier was measured.

The determination of the vasoconstriction which is representative of the inflammatory syndrome and indicative of the onset of action, degree of activity and duration of activity was made by ascertaining the color value of the untreated skin and the treated skin and comparing this with the color value for the normal skin, wherein the value for normal skin is fixed at 100 and the color value for untreated skin at 0. Small, average and high grade vasoconstriction values fall within the range 0 to 100.

TABLE 1

| Compound | Dose in % | \multicolumn{6}{c|}{Observation time in hours} |
|---|---|---|---|---|---|---|---|

| Compound | Dose in % | 1 | 2 | 3 | 4 | 5 | 6 |
|---|---|---|---|---|---|---|---|
| I. 6α-fluoro-11β,21-dihydroxy-16β-methyl-1,4-pregnadiene-3,20-dione | | | | | | | |
| | 0.1 | 5 | 35 | 65 | 100 | | |
| | 0.01 | 0 | 20 | 40 | 50 | | 100 |
| | 0.001 | 0 | 20 | 40 | 55 | 75 | 100 |
| II. 6α,11β-difluoro-9,21-dichloro-16α-methyl-1,4-pregnadiene-3,20-dione | | | | | | | |
| | 0.1 | 30 | 65 | 100 | | | |
| | 0.01 | 25 | 70 | 100 | | | |
| | 0.001 | 10 | 40 | 80 | 90 | 100 | |
| III. 6α,21-difluoro-9,11β-dichloro-16α-methyl-1,4-pregnadiene-3,20-dione | | | | | | | |
| | 0.1 | 20 | 65 | 100 | | | |
| | 0.01 | 15 | 50 | 90 | 100 | | |
| | 0.001 | 10 | 35 | 70 | 90 | 100 | |
| IV. 6α,11β,21-trifluoro-9-chloro-16α-methyl-1,4-pregnadiene-3,20-dione | | | | | | | |
| | 0.1 | 35 | 80 | 100 | | | |
| | 0.01 | 25 | 60 | 100 | | | |
| | 0.001 | 15 | 50 | 80 | 100 | | |
| V. 6α,11β-difluoro-2,9,21-trichloro-16α-methyl-1,4-pregnadiene-3,20-dione | | | | | | | |
| | 0.1 | 10 | 25 | 60 | 100 | | |
| | 0.01 | 10 | 20 | 50 | 100 | | |
| VI 6α,11β,21-trifluoro-2,9-dichloro-16α-methyl-1,4-pregnadiene-3,20-dione | | | | | | | |
| | 0.01 | 20 | 40 | 90 | 100 | | |
| | 0.001 | 10 | 30 | 80 | 90 | 100 | |
| VII 6α,21-difluoro-2,9,11β-trichloro-16α-methyl-1,4-pregnadiene-3,20,dione | | | | | | | |
| | 0.01 | 10 | 30 | 75 | 90 | | |
| | 0.001 | 10 | 20 | 60 | 90 | 100 | |

The values as set out in Table 1 unequivocally establish that when the compounds of the invention are used, the onset of anti-inflammatory activity begins earlier and the desired maximum effect is realized sooner than with the comparison compound. Further, the intensity of the action of the new compounds during the period of action is much higher than that of the known compound.

Further, the high activity of the compounds of the invention is not associated with any undesirable side effects. Thus, for example, the carbohydrate change brought about by the compounds of the invention is in general very slight or is not influenced at all. The gluconogenetic activity is also markedly reduced, as is evidenced by the fact that the blood sugar concentration is not increased and the liver glycogen is only at extremely high doses affected. The only noticeable changes are the slight influence on the liver enzyme tryptophane pyrrolase and the transaminases GOT and GPT. Even less The is the influence on sodium, potassium and phosphate elimination by the active agents in accordance with the invention.

The compounds of the invention can be combined with the conventional carriers and used for making the preparation suitable for treatment. the compounds can be used (a) locally for contact dermatitis, exzema of various types, neurodermatitis, erythrodermatitis, burns Grades I, pruritis vulvae and ani, rosacea erythematodes cutaneous, psoriasis, lichen ruber planus and verrucosus; (b) orally for acute and chronic polyarthritis, neurodermatitis, bronchial asthma, hay fever, etc.

Suitable starting materials for the process set out under (a) are the corresponding 21-hydroxy-9(11)-steroids. A possibility exists that the 21-hydroxy compound is esterified with methane sulfo acid chloride in pyridine at 0°C and then the sulfo acid group is exchanged in the conventional manner for the desired halogen atom, for instance in dimethylformamide with lithium halogenide, i.e., lithium chloride or lithium bromide (about 1 hour at 100°C) or potassium hydrogen fluoride (8–15 hours at about 110°C). For the thereby formed intermediate products, the following physical data have been established.

| | F. in °C | $[\alpha]_D^{25}$, CHCL$_3$ | UV (CH$_3$OH) |
|---|---|---|---|
| 6α-fluoro-21-hydroxy-16α-methyl-4,9(11)-pregnadiene-3,20-dione | | | |
| 6α-fluoro-21-hydroxy-16α-methyl-1,4,9(11)-pregnatriene-3,20-dione | 178–178.5 | +113° | $\epsilon_{235}=16500$ |
| 6α-fluoro-21-mesyloxy-16α-methyl-4,9(11)-pregnadiene-3,20-dione | 174–175 | +35° | $\epsilon_{238}=16800$ |
| 6α-fluoro-21-mesyloxy-16α-methyl-1,4,9(11)-pregnatriene-3,20-dione | oily | +111° | $\epsilon_{235}=16100$ |
| 6α-fluoro-2-chloro-21-hydroxy-16α-methyl-1,4,9(11)-pregnatriene-3,20-dione | 150–151 | +41° | $\epsilon_{138}=17000$ |
| 6α-fluoro-2-chloro-21-mesyloxy-16α-methyl-1,4,9(11)-pregnatriene-3,20-dione | 199–201 | −5° | $\epsilon_{246}=15700$ |
| | 197–199 | +8° | $\epsilon_{246}=15600$ |

The preparation of 6α-fluoro-2-chloro-21-hydroxy-16α-methyl-1,4,9(11)-pregnatriene-3,20-dione can take place, for example, in the following manner:

6α-fluoro-11β-hydroxy-21-acetoxy-16α-methyl-1,4-pregnadiene-3,20-dione was reacted at −10°C in tetrahydrofuran with N-chloro-succinimide and hydrogen chloride. There was formed 6α-fluoro-2-chloro-11β-hydroxy-21-acetoxy-16α-methyl-1,4-pregnadiene-3,20-dione (m.p. 207–209°C) which was converted into 6α-fluoro-2-chloro-21-acetoxy-16α-methyl-1,4,9(11)-pregnatriene-3,20-dione (m.p. 161–162°C) by heating with methane sulfochloride in pyridine-dimethylformamide. The saponification of the 21-acetate is carried out by dissolving the dione in methylene chloride and treating the solution with dilute methanolic soda lye.

The following Examples are given in order to illustrate the invention and are not to be construed as in any way limiting the scope thereof.

EXAMPLE 1

A solution of 3.4 g 6α-fluoro-21-chloro-16α-methyl-1,4,9(11)-pregnatriene-3,20-dione (m.p. 205–206.5°C, $[\alpha]^{25}_D+72°$; $\epsilon_{239}=16,300$) in 152 ml concentrated acetic acid was reacted in sequence with 15.2 g lithium chloride, 3.4 g N-chloro-succinimide and 3.4 ml HCl saturated dioxan. After a 40 minute reaction period, the mixture was poured into sodium sulfate containing water, the precipitated product taken off with suction, washed, dried and chromatographed on silica gel. 3.5–8 percent acetone-pentane eluted 2.49 g 6α-fluoro-9,11β-21-trichloro-16α-methyl-1,4-pregnadiene-3,20-dione having a melting point of 237–239°C (acetone-hexane); $[\alpha]^{25}_D = +180°$; UV: $\epsilon_{236}=15,800$.

EXAMPLE 2

2 ml anhydrous hydrogen fluoride, 3 ml tetrahydrofuran, 4 ml methylene chloride and 2g N-chlorosuccinimide were reacted at −50°C. 1.0 g 6α-fluoro-21-chloro-16α-methyl-1,4,9(11)-pregnatriene-3,20-dione were dissolved in this mixture and then stirred for 30 minutes at 0°C. The resultant mixture was then poured into icewater which contained sodium hydrogen carbonate and sodium sulfate. The material which precipitated out was suctioned off, dried and chromatographed on silica gel. 10.3–11.5 percent acetone-pentane eluted 265 mg 6α-11β-difluoro-9,21-dichloro-16α-methyl-1,4-pregnatriene-3,20-dione having a melting point fo 240.5–242°C(acetone-hexane); $[\alpha]^{25}_D=+137°$; UV: $\epsilon_{236}=15,500$.

EXAMPLE 3

2.2 g 6α,21-difluoro-16α-methyl-1,4,9(11)-pregnatriene-3,20-dione (m.p. 230–232.5°$[\alpha]^{25}_D = +51°$; $\epsilon_{238}=16,400$) were reacted with N-chlorosuccinimide and lithium chloride as set out in Example 1. The crude product was chromatographed. 1.4–2.2 percent acetone-methylene chloride eluted 1.17 g 6α,21-difluoro-9,11β-dichloro-16α-methyl-1,4-pregnadiene-3,20-dione having a melting point of 226–227.5°C (acetone-hexane); $[\alpha]^{25}_D=172°$; UV: $\epsilon_{236}=15,500$.

EXAMPLE 4

2.0 g 6α,21-difluoro-16α-methyl-1,4,9(11)-pregnatriene-3,20-dione was reacted with N-chlorosuccinimide and hydrogen fluoride as set out in Example 2. The crude product was chromatographed. 3.8–5 percent acetone-pentane eluted 1.20 g 6α,11β,21-trifluoro-9-chloro-16α-methyl-1,4-pregnadiene-3,20-dione having a melting point of 222–225°C (acetone-hexane); $[\alpha]^{25}_D=+127°$; UV: $\epsilon_{236}=16,100$.

EXAMPLE 5

30 g 6α-fluoro-21-chloro-16α-methyl-4,9(11)-pregnadiene-3,20-dione (m.p. 145–146°C; $[\alpha]^{25}_D = +142°$; $\epsilon_{235} = 16,500$) was reacted with N-chlorosuccinimide and hydrogen fluoride as set out in Example 2. The crude product was chromatographed. 9.1–10 percent acetone-pentane eluted 1.33 g 6α,11β82-difluoro-9,21-dichloro-16α-methyl-4-pregnene-3,20-dione having a melting point of 236–237°C (acetone-hexane); $[\alpha]^{25}_D=+170°$; UV: $\epsilon_{235}=16,500$.

EXAMPLE 6

A solution of 2.7 g 6α, 20-difluoro-2-chloro-16α-methyl-1, 4, 9(11)-pregnatriene-3, 20-dione (m.p. 169–171° $[\alpha]^{25}_D = +10°$; $\epsilon_{245} = 15,400$) in 110 ml dioxan and 27 ml water were reacted with 11g N-chlorosuccinimide and 11 ml 7 percent perchloric acid.

After an hour the reaction mixture was stirred into sodium sulfate containing icewater. The precipitated substance was isolated and chromatographed on silica gel. The yield amounted to 487 mg 6α,21-difluoro-2,9-dichloro-11β-hydroxy-16α-methyl-1,4-pregnadiene-3,20-dione having a melting point of 238–240°C (acetone-hexane); $[\alpha]^{25}_D = +96°$ (chloroform); UV: $\epsilon_{246} = 15,500$ (methanol).

EXAMPLE 7

2.0 g 6α-fluoro-2,21-dichloro-16α-methyl-1,4,9(11)-pregnatriene-3,20-dione (m.p. 185–187°C; $[\alpha]^{25}_D = +29°$; $\epsilon_{245} = 15,700$) were introduced into chlorohydrin as described in Example 6. The crude product was crystallized out of acetone-hexane and yielded 1.30 g 6α-fluoro-2,9,21-trichloro-11β-hydroxy-16α-methyl-1,4-pregnadiene-3,20-dione having a melting point of 238–239.5°$[\alpha]^{25}_D = +132°$ (chloroform); UV: $\epsilon_{245} = 15,500$ (methanol).

EXAMPLE 8

2.2 g 6α-fluoro-2,21-dichloro-16α-methyl-1,4,9(11)-pregnatriene-3,20-dione, 4.4 g N-bromosuccinimide and 4.4 ml 70 percent perchloric acid in 88 ml dioxan and 22 ml water were stirred together at room temperature for 5 hours. The reaction product was precipitated out of icewater containing sodium sulfate, washed, dried and chromatographed on silica gel. 12–15 percent acetone-pentane eluted 1.32 g 6α-fluoro-2,21-dichloro-9-bromo-11β-hydroxy-16α-methyl-1,4-pregnadiene-3,20-dione having a melting point of 217–219°C (acetone-hexane); $[\alpha]^{25}_D = +117°$ (chloroform); UV: $\epsilon_{249} = 14,200$ (methanol).

EXAMPLE 9

11.3 g 6α-fluoro-2,21-dichloro-9-bromo-11β-hydroxy-16α-methyl-1,4-pregnadiene-3,20-dione and 14.7 g potassium acetate in 300 ml ethanol were heated under reflux for 2 hours. Following cooling, water was introduced, the precipitated product taken off with suction, washed, dried and chromatographed on silica gel. 10–13 percent acetone-pentane eluted 2.99 g 6α-fluoro-2,21-dichloro-9,11β-epoxy-16α-methyl-9β-pregna-1,4-diene-3,20-dione having a melting point of 125–128°$[\alpha]^{25}_D = +58°$ (chloroform); UV: $\epsilon_{253} = 14,300$ (methanol).

EXAMPLE 10

3.0 g 6α-fluoro-2,21-dichloro-9,11β-epoxy-16α-methyl-9β-pregna-1,4-diene-3,20-dione were dissolved at −50°C in a mixture of 11 ml hydrogen fluoride and 10 ml dimethylformamide and allowed to stand for 4 days at 0°C. The reaction mixture was then stirred into sodium hydrogen carbonate containing water, the precipitated material taken off with suction and dissolved in methylene chloride. The solution was washed with water, dried and evaporated in vacuo. The residue was chromatographed on silica gel. 22–23 percent acetone-pentane eluted 986 mg 6α,9-difluoro-2,21-dichloro-11β-hydroxy-16α-methyl-1,4-pregnadiene-3,20-dione having a melting point of 182–183°C (diisopropyl-ether; $[\alpha]^{25}_D = +100°$ (chloroform); UV: $\epsilon_{246} = 14,800$ (methanol).

EXAMPLE 11

4.5 g 6α,21-difluoro-2-chloro-16α-methyl-1,4,9(11)-pregnatriene-3,20-dione in 225 ml concentrated acetic acid were reacted with 4.5 g N-chlorosuccinimide, 22.5 g lithium chloride and 4.5 ml HCl saturated dioxan and stirred for 1 hour at room temperature. The reaction mixture was poured into sodium sulfite containing water and the precipitated material isolated. The recovered material was chromatographed on silica gel. The yield amounted to 1.96 g of 6α,21-difluoro-2,9,11β-trichloro-16α-methyl-1,4-pregnadiene-3,20-dione having a melting point of 243–246°C (methylene chloride-acetone); $[\alpha]^{25}_D = +137°$ (chloroform); UV: $\epsilon_{244} = 15,500$ (methanol).

EXAMPLE 12

A solution of 2.2 g 6α,21-difluoro-2-chloro-16α-methyl-1,4,9(11)-pregnatriene-3,20-dione in 4.4 ml anhydrous hydrogen fluoride, 6.6 ml tetrahydrofuran and 8.8 ml methylene chloride were reacted at −50°C with 4.4 g N-chlorosuccinimide. After a 16-hour reaction period, the reaction mixture was poured into water containing sodium hydrogen carbonate and sodium sulfite at 0°C. The precipitated material was suctioned off, dissolved in methylene chloride, the solution washed with water, dried and concentrated in vacuo. The residue was chromatographed on silica gel. 12–15 percent acetone-hexane eluted 453 mg 6α,11β,21-trifluoro-2,9-dichloro-16α-methyl-1,4-pregnadiene-3,20-dione having a melting point of 249–250°C (acetone-hexane); $[\alpha]^{25}_D = +86°$ (chloroform); UV: $\epsilon_{244} = 15,600$ (methanol).

EXAMPLE 13

2.0 g 6α-fluoro-2,21-dichloro-16α-methyl-1,4,9(11)-pregnatriene-3,20-dione were reacted with N-chlorosuccinimide and lithium chloride as described in Example 11. The crude product was chromatographed. The yield amounted to 692 mg 6α-fluoro-2,9,11β,21-tetrachloro-16α-methyl-1,4-pregnadiene-3,20-dione having a melting point of 250–252°C (acetone-hexane); $[\alpha]^{25}_D = +142°$ (chloroform); UV: $\epsilon_{244} = 15,500$ (methanol).

EXAMPLE 14

2.0 g 6α-fluoro-2,21-dichloro-16α-methyl-1,4,9(11)-pregnatriene-3,20-dione were reacted with N-chlorosuccinimide and hydrogen fluoride as described in Example 12. The crude product was chromatographed. 8–9 percent acetone-pentane eluted 367 mg 6α,11β-difluoro-2,9,21-trichloro-16α-methyl-1,4-pregnadiene-3,20-dione having a melting point of 232–237°$[\alpha]^{25}_D = +103°$ (chloroform); UV: $\epsilon_{243} = 15,500$

EXAMPLE 15

A solution of 3.0 g 6α-fluoro-2-chloro-21-acetoxy-16α-methyl-1,4,9(11(-pregnatriene-3,20-dione in 120 ml dioxan was reacted with 30 ml water, 12 g N-chlorosuccinimide and 12 ml 70 percent perchloric acid and stirred for an hour at room temperature. The reaction mixture was poured into water containing sodium sulfite, the precipitated product suctioned off, washed, dried and chromatographed on silica gel. 2.3–4.3 percent acetone methylene chloride eluted 1.23 g 6α-fluoro-2,9-dichloro-11α-hydroxy-21-acetoxy-16α-methyl-1,4-pregnadiene-3,20-dione having a melting point of 120–121°C (methanol); [α]$^{25}_D$ = +104° (chloroform); UV: ε$_{246}$ = 14,800 (methanol).

1.20 g 6α-fluoro-2,9-dichloro-11β-hydroxy-21-acetoxy-16α-methyl-1,4-pregnadiene-3,20-dione were dissolved in 25 ml methylene chloride. 24 ml methanolic 0.2N potassium hydroxide solution were introduced and stirring continued for 10 minutes at room temperature under nitrogen. The reaction mixture was diluted with methylene chloride, washed to neutrality with water, dried and concentrated in vacuum. The residue was chromatographed. 11–13.5 percent acetone-methylene chloride eluted 480 mg 6α-fluoro-2,9-dichloro-11β,21-dihydroxy-16α-methyl-1,4-pregnadiene-3,20-dione having a melting point of 249–250°C (methylene chloride); [α]$^{25}_D$ = +95° (chloroform); UV: ε$_{245}$ = 15,200 (methanol).

450 mg 6α-fluoro-2,9-dichloro-11β,21-dihydroxy-16 α-methyl-1,4-pregnadiene-3,20-dione were dissolved in 10 ml abs. pyridine, the solution reacted with 2 ml methane-sulfonic acid chloride and under exclusion of moisture stored for 16 hours at room temperature. The resulting mixture was diluted with methylene chloride, the methylene chloride phase washed with dilute sulfuric acid and water, dried and concentrated in vacuum. The residue was chromatographed on silica gel. There was obtained 110 mg 6α-fluoro-2,9,21-trichloro-11β-hydroxy-16α-methyl-1,4-pregnadiene-3,20-dione having a melting point of 237–239°C (acetone-hexane); [α]$^{25}_D$ = +132° (chloroform); UV: ε$_{245}$ = 15,6000 (methanol).

EXAMPLE 16

6.2 g 6α,21-difluoro-2-chloro-16α-methyl-1,4,9(11)-pregnatriene-3,20-dione were, as set out in Example 8, converted with bromohydrin. The crude product was chromatographed on silica gel. 13–18 percent acetone-pentane eluted 2.30 g 6α,21-difluoro-2-chloro-9-bromo-11β-hydroxy-16α-methyl-1,4-pregnadiene-3,20-dione having a melting point of 203–211°C (acetone-hexane); [α]$^{25}_D$ = +10° (chloroform); UV: ε$_{249}$ = 14,200 (methanol).

EXAMPLE 17

2.2 g 6α,21-difluoro-2-chloro-9-bromo-11β-hydroxy-16α-methyl-1,4-pregnadiene-3,20-dione were, as set out in Example 9, converted into the epoxide. The crude product was chromatographed on silica gel. 8–9 percent acetonehexane eluted 1.02 g 6α,21-difluoro-2-chloro-9,11β-epoxy-16α-methyl-9β-pregna-1,4-diene-3,20-dione having a melting point of 192–194°C (Acetone-hexane); [α]$^{25}_D$ = +43° (chloroform); UV: ε$_{253}$ = 14,900 (methanol).

EXAMPLE 18

950 mg 6α,21-difluoro-2-chloro-9,11β-epoxy-16α-methyl-9β-pregna-1,4-diene-3,20-dione were, as set out in Example 10, reacted with hydrogen fluoride. The crude product was crystallized out of acetone-hexane. There were recovered 316 mg 6α,9,21-trifluoro-2-chloro-11β-hydroxy-16α-methyl-1,4-pregnadiene-3,20-dione having a melting point of 194–199°C. [α]$^{25}_D$ = −64° (chloroform), UV: ε$_{246}$ = 14,500 (methanol).

We claim:
1. 21-halogensteroids having the formula

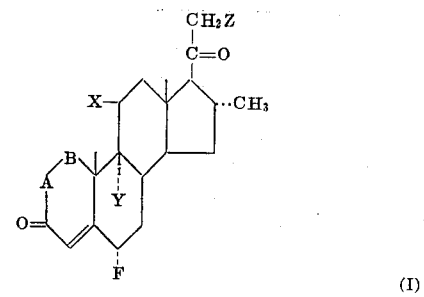

(I)

wherein -A-B- is a member selected from the group consisting of —CH=CH— and —CCl=CH—, Y and Z are each a halogen atom and X is a halogen atom having the same or a lesser atomic weight than Y and in the case where —A—B— represents —CCl=CH—, then X can also be hydroxy.

2. 21-halogensteroids according to claim 1, wherein —A—B— is and —CH=CH—, Y and Z are each a halogen atom and X is a halogen atom having the same or a lesser atomic weight than Y.

3. 21-halogensteroids according to claim 1, wherein —A—B is —CCl=CH—, Y and Z are each a halogen atom and X is a halogen atom having the same or a lesser atomic weight than Y, and X can also be hydroxy.

4. 21-halogen steroid according to claim 1 designated 6α-fluoro-9,11β,21-trichloro-16α-methyl-1,4-pregnadiene-3,20-dione.

5. 21-halogen steroid according to claim 1 designated 6α,11β-difluoro-9,21-dichloro-16α-methyl-1,4-pregnadiene-3,20-dione.

6. 21-halogen steroid according to claim 1 designated 6α,21-difluoro-9,11β-dichloro-16α-methyl-1,4-pregnadiene-3,20-dione.

7. 21-halogen steroid according to claim 1 designated 6α,11β,21-trifluoro-9-chloro-16α-methyl-1,4-pregnadiene-3,20-dione.

8. 21-halogen steroid according to claim 1 designated 6α,21-difluoro-2,9-dichloro-11β-hydroxy-16α-methyl-1,4-pregnadiene-3,20-dione.

9. 21-halogen steroid according to claim 1 designated 6α-fluoro-2,9,21-trichloro-11β-hydroxy-16 α-methyl-1,4-pregnadiene-3,20-dione.

10. 21-halogen steroid according to claim 1 designated 6α-fluoro-2,21-dichloro-9-bromo-11β-hydroxy-16α-methyl-1,4-pregnadiene-3,20-dione.

11. 21-halogen steroid according to claim 1 designated 6α,9-difluoro-2,21-dichloro-11β-hydroxy-16α-methyl-1,4-pregnadiene-3,20-dione.

12. 21-halogen steroid according to claim 1 designated 6α,21-difluoro-2-chloro-9-bromo-11β-hydroxy-16α-methyl-1,4-pregnadiene-3,20-dione.

13. 21-halogen steroid according to claim 1 designated 6α9,21-trifluoro-2-chloro-11β-hydroxy-16α-methyl-1,4-pregnadiene-3,2-dione.

14. 21-halogen steroid according to claim 1 designated 6α,21-difluoro-2,9,11β-trichloro-16α-methyl-1,4-pregnadiene-3,20-dione.

15. 21-halogen steroid according to claim 1 designated 6α,11β,21-trifluoro-2,9-dichloro-16α-methyl-1,4-pregnadiene-3,20-dione.

16. 21-halogen steroid according to claim 1 designated 6α-fluoro-2,9,11β,21-tetrachloro-16α-methyl-1,4-pregnadiene-3,20-dione.

17. 21-halogen steroid according to claim 1 designated 6α,11β-difluoro-2,9,21-trichloro-16α-methyl-1,4-pregnadiene-3,20-dione.

* * * * *